United States Patent
Kim et al.

(10) Patent No.: US 7,334,931 B2
(45) Date of Patent: Feb. 26, 2008

(54) BACKLIGHT UNIT AND METHOD OF MANUFACTURING DIFFUSER EMPLOYED IN THE BACKLIGHT UNIT

(75) Inventors: Sun-il Kim, Suwon-si (KR); Hwan-young Choi, Yongin-si (KR); Moon-gyu Lee, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 148 days.

(21) Appl. No.: 11/043,180

(22) Filed: Jan. 27, 2005

(65) Prior Publication Data

US 2005/0180170 A1 Aug. 18, 2005

(30) Foreign Application Priority Data

Jan. 27, 2004 (KR) ............... 10-2004-0004984

(51) Int. Cl.
*F21V 7/04* (2006.01)
*F21V 5/00* (2006.01)

(52) U.S. Cl. ............ 362/606; 362/330; 362/355; 349/64

(58) Field of Classification Search ........ 362/600–634, 362/26, 27, 558, 561, 235, 311, 307–309, 362/326–340, 355; 349/64; 359/15, 559
See application file for complete search history.

(56) References Cited

U.S. PATENT DOCUMENTS 4,460,940 A * 7/1984 Mori ............... 362/558
5,903,391 A * 5/1999 Toshima et al. ......... 359/599
6,231,201 B1 * 5/2001 Rupp ................. 362/614

FOREIGN PATENT DOCUMENTS

| KR | 2001-57327 A | 7/2001 |
|----|--------------|--------|
| KR | 2003-38294 A | 5/2003 |

* cited by examiner

*Primary Examiner*—Sandra O'Shea
*Assistant Examiner*—Bao Q. Truong
(74) *Attorney, Agent, or Firm*—Sughrue Mion, PLLC (57) ABSTRACT

A luminous backlight unit designed to compensate for a difference in distribution of light output on an output surface of a light guiding panel, and a method of manufacturing a diffuser employed in the backlight unit. The backlight unit includes: one or more light sources that emit light; a light guide panel which guides the propagation of light incident through a side edge thereof and has a light-emission surface; a holographic pattern provided on a surface of the light guide panel, for converting the incident light into a surface light and outputting the converted surface light to the light-emission surface; and a diffuser disposed facing the light-emission surface, for diffusing the emitted light from the light-emission surface and is characterized in that distribution of diffusion angles is varied as it goes from a point close to the light source to a point distant from the light source.

2 Claims, 8 Drawing Sheets

BACKLIGHT UNIT AND METHOD OF MANUFACTURING DIFFUSER EMPLOYED IN THE BACKLIGHT UNIT

BACKGROUND OF THE INVENTION

This application claims priority from Korean Patent Application No. 10-2004-0004984, filed on Jan. 27, 2004, in the Korean Intellectual Property Office, the disclosure of which is incorporated herein in its entirety by reference.

1. Field of the Invention

The present invention relates to an edge type luminous backlight unit and a method of manufacturing a diffuser employed in the backlight unit, and more particularly, to a backlight unit designed to compensate for a difference in distribution of light output on an output surface of a light guide panel, and a method of manufacturing a diffuser employed in the backlight unit.

2. Description of the Related Art

Typically, a liquid crystal display (LCD) is a flat panel display and needs a separate light source to produce an image since the LCD itself does not emit light. To this end, a backlight is located behind the LCD and emits light. Backlight units are classified into direct light type units and edge type units according to the position of a light source arranged.

A general edge type backlight unit transfers light irradiated from a light source located on an edge of a light guide panel (LGP) to an LCD panel via the LGP. As the light source for the edge type backlight unit, a linear light source such as a cold cathode fluorescent lamp (CCFL), or a point light source such as a light emitting diode (LED) is employed.

Figure 1:
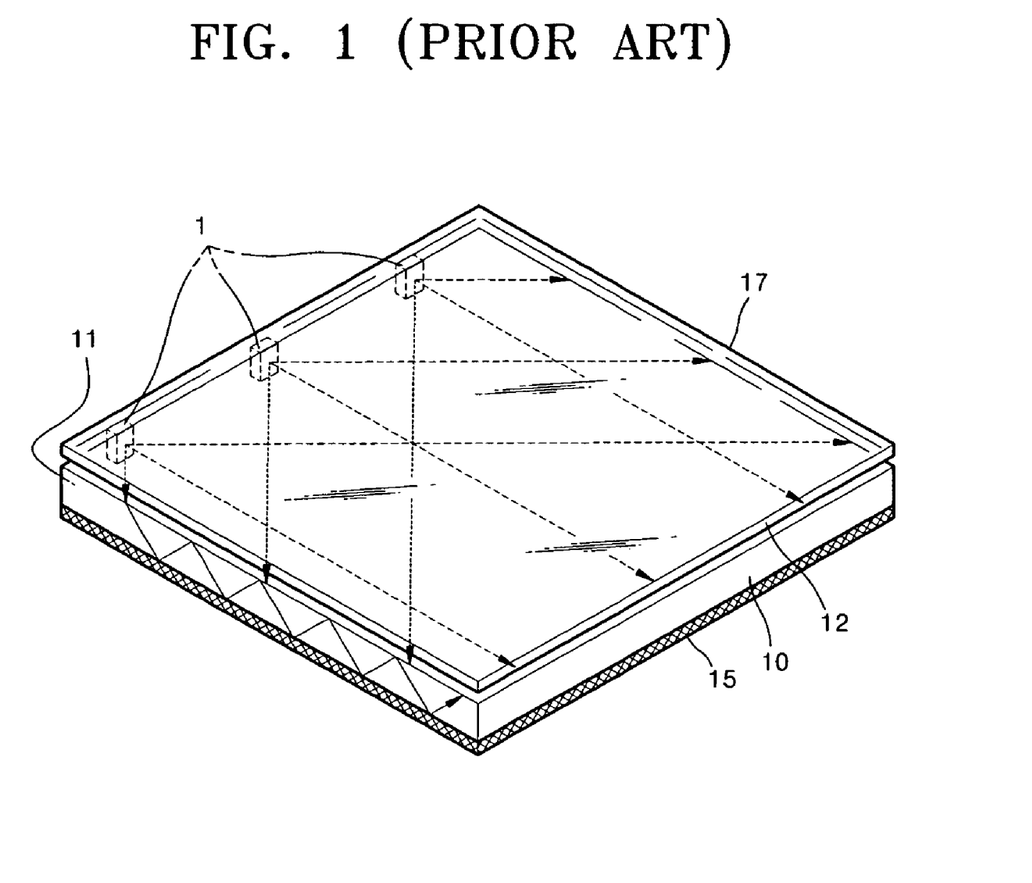
FIG. 1 is a schematic perspective view of a conventional edge type backlight unit using a point light source.
Figure 2:
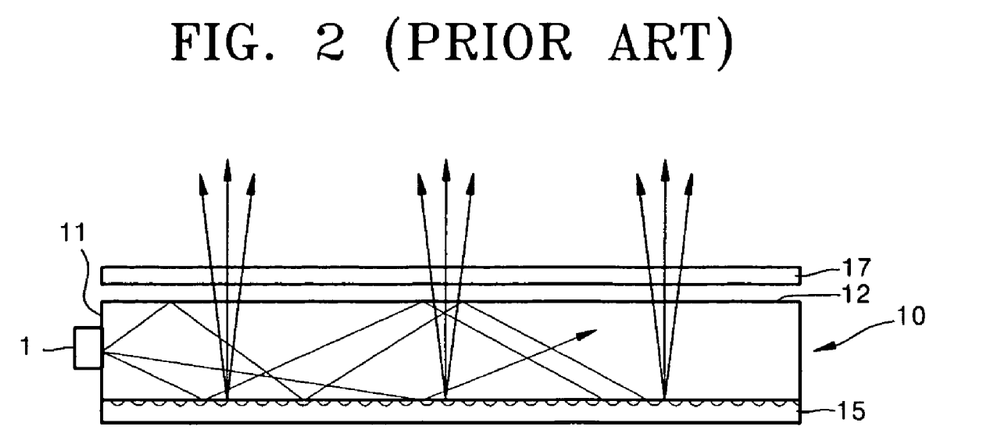
FIG. 2 is a sectional view of FIG. 1.

Referring to FIGS. 1 and 2, a conventional edge type backlight is provided with three LEDs 1, which are point light sources disposed along one edge 11 of an LGP 10 and emit light toward the edge 11. The LGP 10 converts a light incident from the LEDs 1 into a surface light, and outputs the converted surface light in a vertical direction. For this operation, the backlight has a holographic pattern 15 at the bottom of the LGP 10, which allows light emitted by the LEDs 1 to be directed onto a light emission surface 12 and a diffuser 17 on the light-emission surface 12, which diffuses the emitted surface light from the light-emission surface 12.

The holographic pattern 15 is a diffractive grating structure, and converts incident light into surface light and diffracts the converted surface light onto the light-emission surface 12.

As the range of incident azimuth angles of light being incident on the holographic pattern 15 decreases, uniformity of brightness over the light-emission surface 12 increases. Uneven brightness over the light-emission surface 12 makes a screen appear motted. In a narrow range of about 1 cm or so, a brightness variation of about 0.9 is detected as a stain on the screen. However, a slow variation in brightness of about 0.8 between the screen's center and corners may not be detected as a stain. Hence, a brightness uniformity of at least 0.8 is required to prevent a stain on the screen. To achieve a better quality image, a brightness uniformity of 0.9 or more is required.

Figure 3:
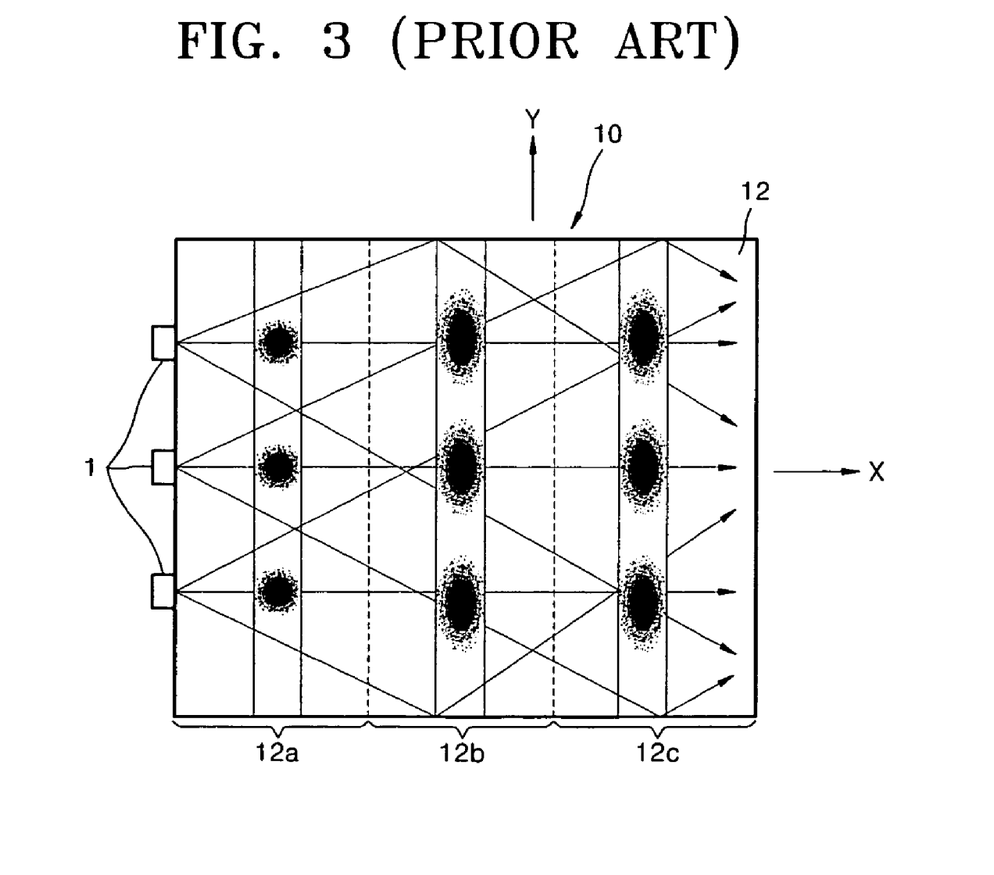
FIG. 3 is a schematic view of light output distribution in the backlight unit shown in FIG. 1.

Referring to FIG. 3, the light-emission surface 12 is divided into three regions of a light input region 12a, a central region 12b and a large light region 12c, which are disposed in a direction away from the edge 11. At this point, when reviewing distributions of output lights in each of the three regions 12a, 12b, and 12c, the central region 12b has a wider distribution of the output light than that of the light input region 12a, and the large light region 12c has a wider distribution of the output light than that of the central region 12b.

In the meanwhile, the diffuser 17 diffuses the surface light emitting from the light-emission surface 12 to obtain more uniform light, and has the same diffusion angle distribution. Accordingly, a distribution of the light emitting through the diffuser 17 is the same as that of the surface light emitting through the light-emission surface 12.

Figure 4:
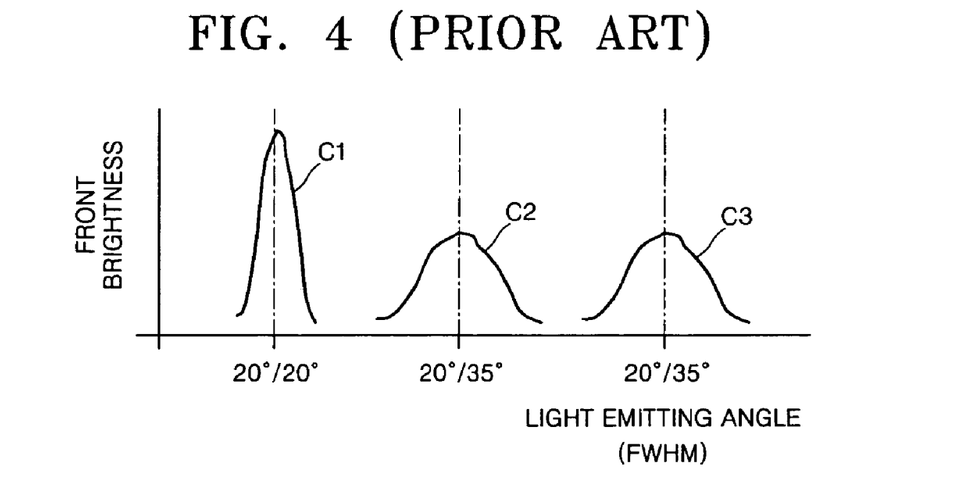
FIG. 4 is a graph showing a front brightness in a light output surface of the conventional backlight unit shown in FIG. 1.

FIG. 4 is a graph illustrating brightness of lights emitting from the respective regions of FIG. 3. In FIG. 4, a vertical axis represents a front brightness and a horizontal axis represents a light emitting angle as a forward half maximum (FWHM) angle. Three curves C1 through C3 represent brightnesses of the light input region 12a, the central region 12b and the large light region 12c, respectively.

From the graph of FIG. 4, it is understood that the brightness of the light input region 12a is greater than that of the central region 12b. Also, the light input region 12a has a FWHM angle of 20□/20□ while the central region 12b and the large light region 12c have a FWHM angle of 20°/35°. In the representation of the FWHM angle, the values before and after the slash "/" denote FWHM angles in X and Y directions in FIG. 3, respectively.

Thus, such a difference in the brightness on each region 12a, 12b, or 12c arises because the range of azimuth angles of light incident on the holographic pattern 15 is narrower in the light incident region 12a than in the central region 12b and the large light region 12c. That is, since lights having various incident azimuth angles are incident onto the holographic pattern 15 after being reflected several times as shown in FIG. 2, such a difference is shown. The non-uniformity of the brightness is progressively more severe as the incident azimuth angle of the light emitting from the LEDs 1 and then incident onto the LGP 10 increases.

Accordingly, since the conventional backlight unit has a narrow output light distribution in the light incident region 12a and a wide output light distribution in the large light region 12c, non-uniformity and loss of the output light are caused.

SUMMARY OF THE INVENTION

The present invention provides an edge type backlight unit and a method of manufacturing a diffuser employed in the backlight unit in which the diffuser has an improved structure to compensate for a difference in distribution of output lights emitting from an LGP, thereby capable of enhancing the uniformity of final output light.

According to an aspect of the present invention, there is provided a backlight unit comprising: one or more light sources that emit light; a light guide panel which guides the propagation of light incident through a side edge thereof and has a light-emission surface; a holographic pattern provided on a surface of the light guide panel, for converting the incident light into a surface light and outputting the converted surface light to the light-emission surface; and a diffuser disposed facing the light-emission surface, for diffusing the emitted light from the light-emission surface and is characterized in that distribution of diffusion angles is varied as it goes from a point close to the light source to a point distant from the light source.

The diffuser may have a diffusion angle, which is reduced as it goes from a point close to a light source to a point distant from the light source.

According to another aspect of the present invention, there is provided a method of manufacturing a diffuser of a backlight unit, the method comprising: preparing a light source, a source diffuser having a diffusion pattern, and an exposure plate disposed facing the source diffuser; irradiating light and exposing the exposure plate to allow a center of the light as irradiated to be eccentric from a center of the exposure plate; developing, cleaning and plating the exposure plate to form a record plate having a pattern corresponding to the diffusion pattern; and forming a diffuser having the diffusion pattern by an injection molding using the record plate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 5:
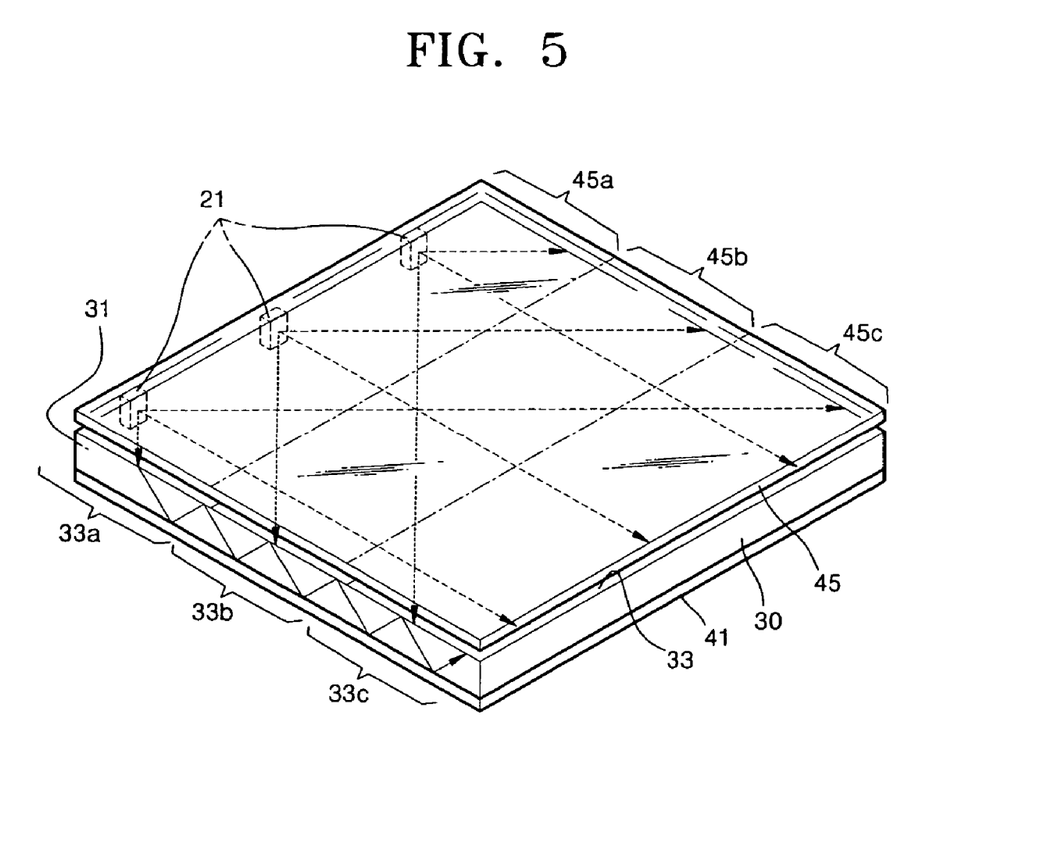
FIG. 5 is a schematic perspective view of a backlight unit according to an exemplary embodiment of the present invention.

Referring to FIG. 5, an edge type backlight according to an embodiment of the present invention includes at least one light source 21 for irradiating light, a light guide panel (LGP) 30 for guiding progression of light irradiated by the light source 21, a holograpic pattern 41 disposed at the bottom of the LGP 40, and a diffuser 45 disposed facing a light-emission surface 33 of the LGP 40 for diffusing the light emitted through the light-emission surface 33.

The light source 21 includes a point light source such as an LED or a linear light source such as a CCFL, and emits light toward an edge 31 of the LGP 30.

In the present embodiment, although it is exemplarily shown that three LEDs used as the light source 21 are installed on the edge 31, the number of the LEDs may be set differently. In other words, since the number of the LEDs depends on a size of the LGP 30 and requested brightness, more or less than three LEDs can be provided if necessary.

The LGP 30 guides progression of light incident through the edge 31 from the light source 21, and is made of a transparent material allowing transmission of incident light. For example, the LGP 30 is made of acryl-based transparent resin such as polymethylmethacrylate (PMMA) having a refractive index of about 1.49 and a specific gravity of about 1.19, or is made of olefin-based transparent resin having a specific gravity of 1.0 for lightweight. In an exemplary embodiment, the LGP 30 is made in a planar structure having a thickness range of 2-3 mm.

The LGP 30 converts a light incident from the light source 21 into a surface light and outputs the converted surface light through the light-emission surface 33. The light-emission surface 33 is divided into three regions of a light input region 33a, a central region 33b and a large light region 33c, which are disposed in a direction away from the edge 31. At this point, when reviewing distributions of output lights in each of the three region 33a, 33b, or 33c, like in the conventional LGP, the central region 33b has a wider distribution of the output light than that of the light input region 33a, and the large light region 33c has a wider distribution of the output light than that of the central region 33b.

The holographic pattern 40 is disposed at the bottom of the LGP 30 and diffracts incident light such that the light incident through the edge 21 is directed toward the light-emission surface 33. The holographic pattern 41 may have a structure that diffraction lattices having a period of 0.4 μm and a depth of 0.2 μm are repeatedly arranged.

In the meanwhile, the diffuser 45 diffuses the surface light emitting from the light-emission surface 33 at a predetermined angle such that a uniform diffusion light is lighted onto an LCD or the like. For this purpose, the diffuser 45 is characterized in that distribution of diffusion angles is varied as it goes from a point close to the light source 21 to a point distant from the light source 21.

Figure 6:
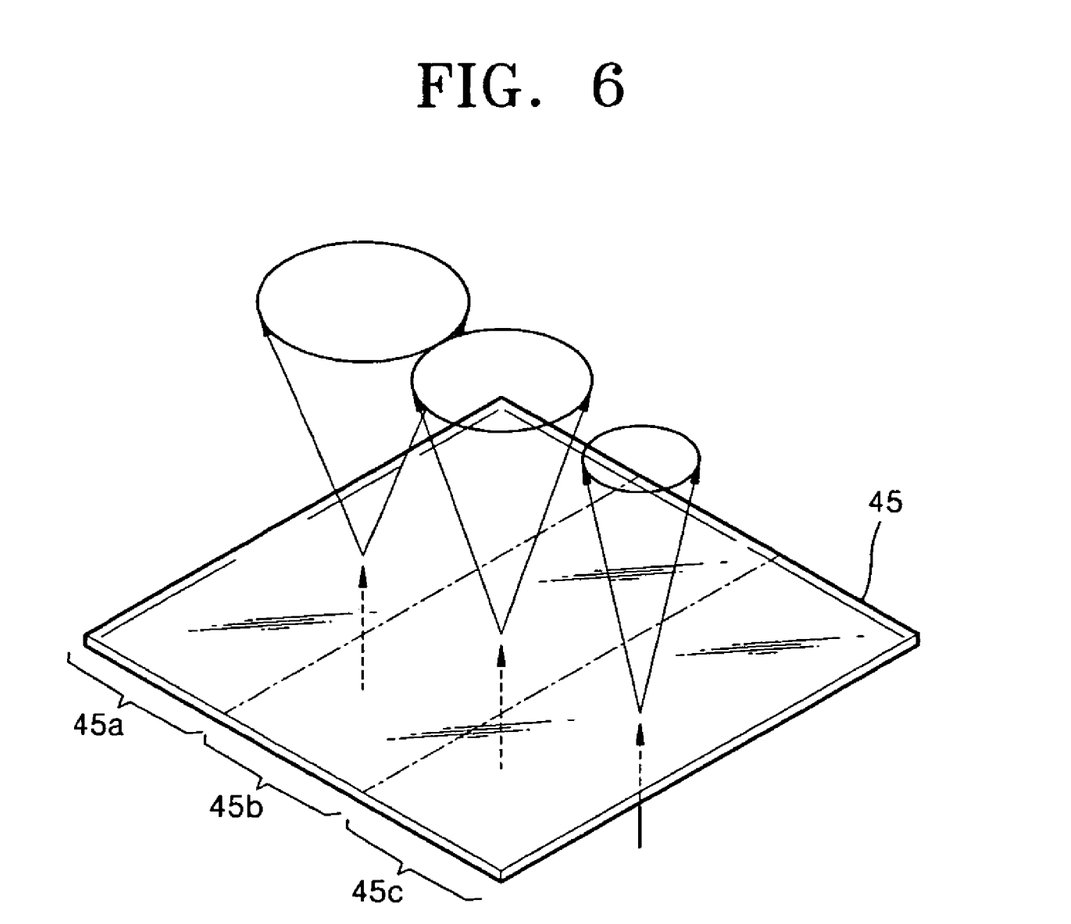
FIG. 6 is a schematic view illustrating diffusion distribution by a diffuser of a backlight unit according to an exemplary embodiment of the present invention.

The diffuser 45 can be divided into three regions, i.e., first through third regions 45a, 45b and 45c corresponding to the light incident region 33a, the central region 33b and the large light region 33c, respectively. As shown in FIG. 6, the diffuser 45 is designed such that the diffusion angle decreases as it goes from the first region 45a to the third region 45c.

In an exemplary embodiment, the diffuser 45 has a diffusion pattern having a concave-convex surface. A method of manufacturing the diffuser 45 will be described later.

As described above, by designing the diffuser 45 such that the distribution of the diffusion angles of the diffuser 45 is inverse with respect to that of the output light in the respective regions 33a, 33b and 33c of the light output surface 33, it is possible to compensate for a difference in the distribution of light outputted from the LGP 30. As a result, the uniformity in the distribution of the light emitting through the diffuser 45 can be enhanced.

Referring to FIGS. 7 through 10, a method of manufacturing a diffuser for a backlight unit according to an exemplary embodiment of the present invention includes: exposing a prepared exposure plate 60, thereby forming a diffusion pattern, i.e., a diffusion pattern having a distribution of continuously different diffusion angles on the exposure plate 60; post-treating the exposure plate 60, thereby forming a record plate (not shown); and forming a diffuser (see 45 of FIG. 5) having the diffusion pattern by an injection molding using the record plate. Herein, the exposure plate 60 includes a substrate 61 and a photoresist layer 63 formed on the substrate 61. Light is irradiated onto the photoresist layer 63, thereby forming an exposure pattern corresponding to the diffusion pattern.

Figure 7:
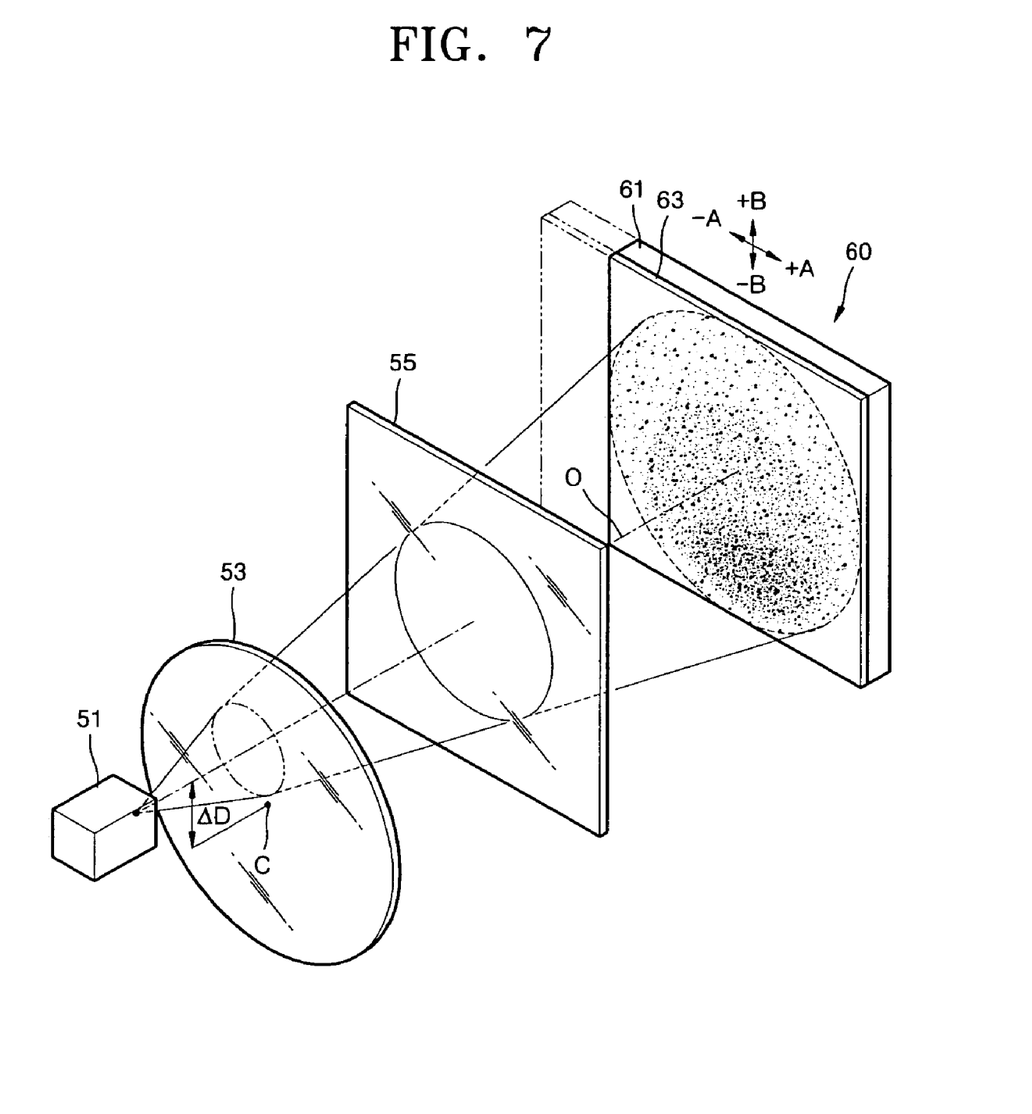
FIG. 7 is a schematic perspective view illustrating a method of manufacturing a diffuser of a backlight unit according to an exemplary embodiment of the present invention.
Figure 8:
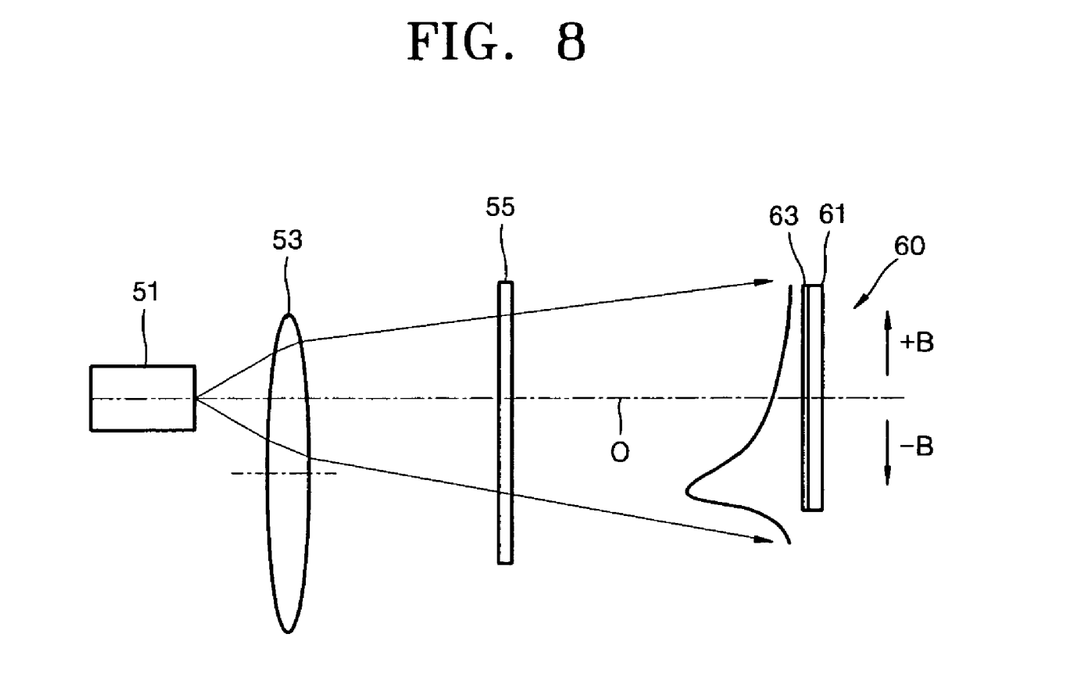
FIG. 8 is a sectional view of FIG. 7.

In the forming of the record plate after the photoresist layer 63 of the exposure plate 60 is developed and cleaned, an electroplating process of the substrate 61 is performed. Since the above record plate forming process in itself is well known in the art, its detailed description will be omitted.

The forming of the diffusion pattern on the exposure plate 60 can be classified into three steps.

In a first step, the exposure plate 60, a light source 51 for exposing the exposure plate 60 to light, and a source diffuser 55 are prepared. The source diffuser and the exposure plate 60 are disposed in a direction away from the light source 51.

In a second step, the exposure plate 60 is exposed in a pattern corresponding to the diffusion pattern of the source diffuser 55. The light source 51 emits a light having a predetermined wavelength, for example, a wavelength of 458 nm. The source diffuser 55 has the diffusion pattern corresponding to the diffusion pattern of the diffuser (45 of FIG. 5) according to the present invention. Accordingly, the light emitted by the light source 51 is diffused while passing through the source diffuser 55 to expose the photoresist layer 63 in a pattern corresponding to a predetermined diffusion pattern.

In a third step, a center of the emitted light is made eccentric on the exposure plate.

FIGS. 7 and 8 illustrate an embodiment in which a center of the irradiated light is made eccentric on the exposure plate.

Referring to FIGS. 7 and 8, a condensing lens 53 is disposed on an optical path between the light source 51 and the source diffuser 55. At this point, the light source 51, the source diffuser 55 and the exposure plate 60 are disposed on an identical optical axis 'O', and the condensing lens 53 is disposed such that a center 'C' of the condensing lens 53 is made eccentric by ΔD from the optical axis 'O'. When light is irradiated onto the exposure plate 60, the center of the light focused by the condensing lens 53 is deviated from the optical axis 'O'. In reviewing the light profile formed on the exposure plate 60, a portion having the highest light intensity is made eccentric in a–B direction. In the meanwhile, since the light source 51 is a point light source, light intensity is distributed centering on one point. Hence, to maintain a uniform light intensity distribution in an A direction of FIG. 7, the exposure plate 60 is driven in a direction normal to a light irradiation direction and the eccentric direction, i.e., ±A direction.

Figure 9:
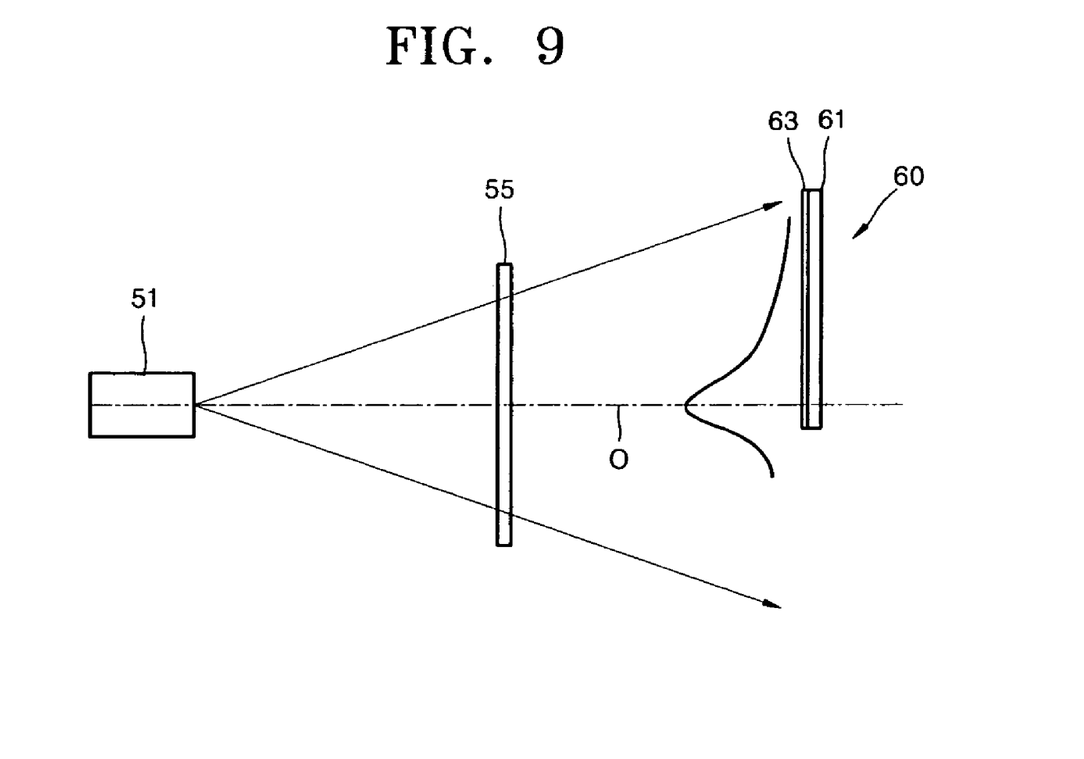
FIG. 9 is a schematic view illustrating a method of manufacturing a diffuser of a backlight unit according to another exemplary embodiment of the present invention.

FIG. 9 illustrates another exemplary embodiment in which a center of the irradiated light is made eccentric toward a direction of the exposure plate.

Referring to FIG. 9, the light source 51 and the source diffuser 55 are disposed on an identical optical axis 'O', and the exposure plate 60 is disposed eccentric with respect to the optical axis 'O'. After the above arrangement is completed, when light is irradiated onto the exposure plate 60, light intensity is symmetrically distributed with a center of the optical axis 'O'. In this case, the center of the light intensity is deviated from a center of the exposure plate 60. Accordingly, in reviewing the profile of the light formed on the exposure plate 60, a portion having the highest light intensity is made eccentric in a direction. In this case, the exposure plate 60 is linearly driven in a direction perpendicular to a light irradiation direction and the eccentric direction during the light irradiation operation.

Figure 10:
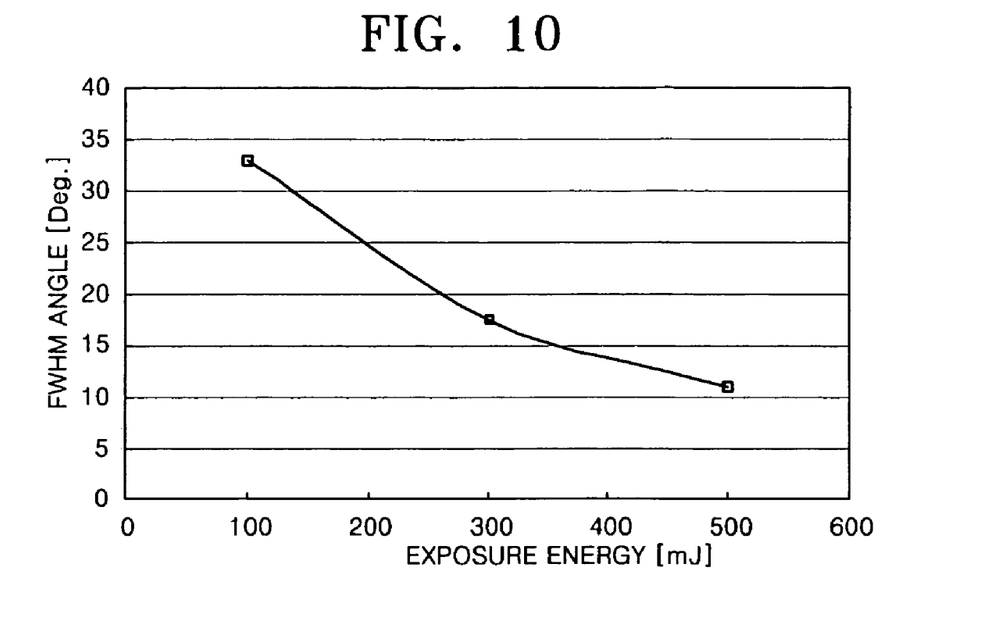
FIG. 10 is a graph showing variation of FWHM angles depending on variation of exposure energy.
Figure 11:
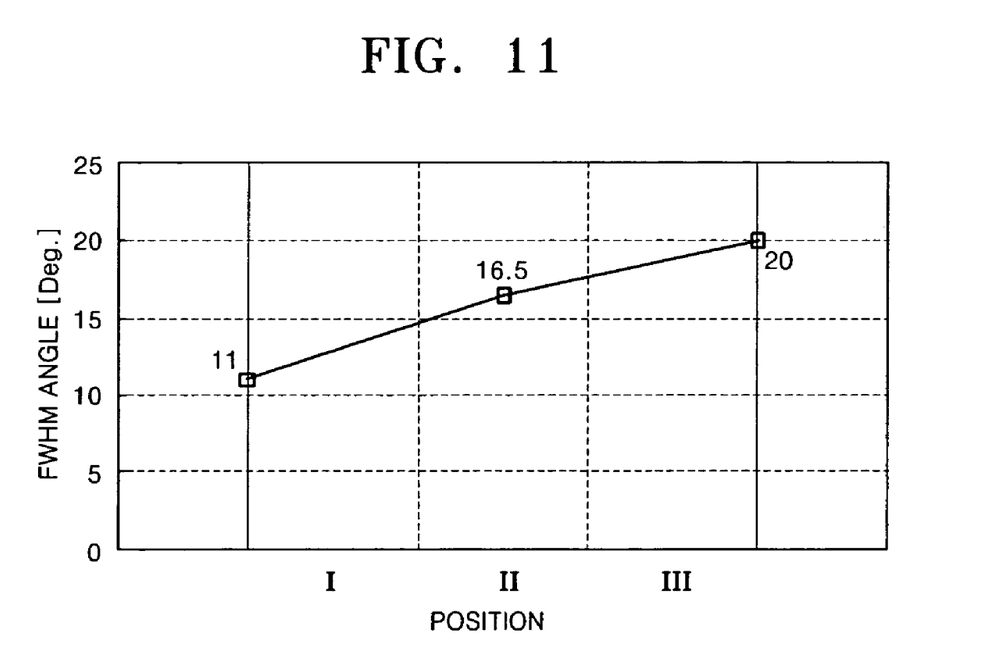
FIG. 11 is a graph showing a difference of FWHM angles depending on position of a diffuser in an embodiment of the present invention.
Figure 12:
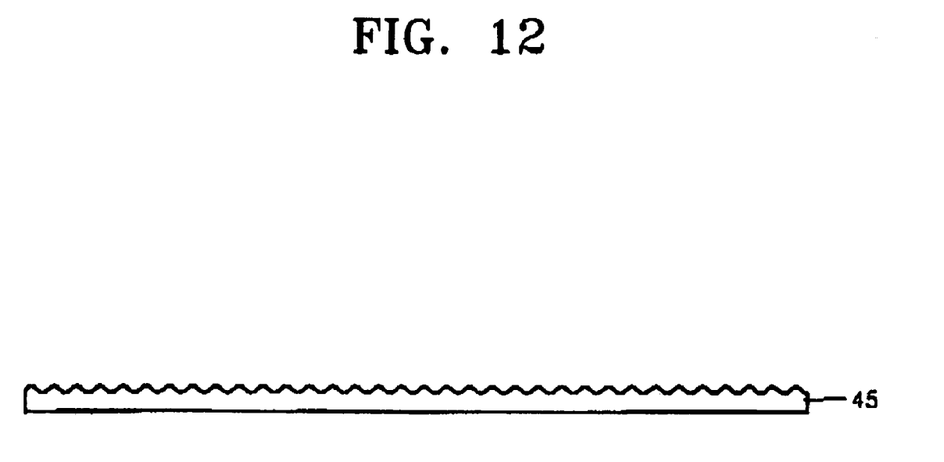
FIG. 12 illustrates the diffuser of FIG. 5.

As described above, when the exposing is performed at different light intensities, different forward half maximum (FWHM) angles are obtained as shown in FIGS. 10 and 11, thereby capable of manufacturing a diffuser suitable for compensating for the light intensity of the backlight unit.

Referring to FIG. 10, when an exposure energy is a relatively small value, for example, approximately 100 mJ, a large FWHM angle of approximately 30° is obtained. On the contrary, when the exposure energy is a relatively large value, for example, approximately 500 mJ, a small FWHM angle of approximately 10° is obtained.

Accordingly, when the diffuser is manufactured by performing the exposure using the processes shown in FIGS. 7 through 9, the FWHM angle in a portion corresponding to a portion having the highest light intensity has the smallest value, and the FWHM angle increases as it goes to a portion where the light intensity is weak.

When the diffuser is manufactured on the basis of the above fact, the FWHM angle at each position is shown in FIG. 11. Referring to FIG. 11, when the diffuser is divided into three sections, I, II and III according to their positions, the FWHM angle increases gradually as it goes from the section I to the section III.

Accordingly, the diffuser may be made such that the section I corresponds to the third region 45c of the diffuser, the section II to the second region 45b, and the section III to the first region 45a, and is then disposed on the LGP 30.

By employing the aforementioned exposure process, a diffuser of which diffusion angle distribution is continuously varied can be manufactured. By employing the above diffuser in a backlight unit, it becomes possible to compensate for a difference in distribution of light output angles, thereby enhancing the uniformity of distribution of light.

As described above, the backlight unit according to exemplary embodiments of the present invention employs a diffuser on an LGP, the diffuser having an FWHM angle, which is continuously varied as it goes to a point distant from a light source, to compensate for a difference in distribution of light outputted from the LGP, thereby capable of enhancing the uniformity of distribution of light, which is finally outputted.

Also, the method of manufacturing a diffuser according to exemplary embodiments of the present invention performs an exposure using an eccentric arrangement of optical elements during the exposing of the exposure plate, and thus it becomes possible to manufacture the diffuser having a diffusion pattern of which FWHM angle is continuously varied.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit comprising:
   one or more light sources that emit light;
   a light guide panel which guides the propagation of light incident through a side edge thereof and has a light-emission surface;
   a holographic pattern provided on a surface of the light guide panel, which converts light incident thereon into surface light and outputs the surface light toward the light-emission surface; and
   a diffuser disposed facing the light-emission surface and having a diffusion pattern, which diffuses light emitted from the light-emission surface, wherein a distribution of diffusion angles decreases continuously from a point close to the one or more light sources to a point distant from the one or more light sources; and wherein the diffusion pattern is formed by exposure energy which continuously increases from a point close to the one or more light sources to a point distant from the one or more light sources.

2. The backlight unit of claim 1, wherein the diffusion pattern has a concave-convex surface.

* * * * *